(No Model.)  2 Sheets—Sheet 1.

S. E. HUGHES.
WATER CLOSET.

No. 481,761. Patented Aug. 30, 1892.

Witnesses:
L. D. Turner
R. Schleicher

Inventor:
Smith E. Hughes
by his Attorneys
Howson & Howson (No Model.) 2 Sheets—Sheet 2.

S. E. HUGHES.
WATER CLOSET.

No. 481,761. Patented Aug. 30, 1892.

Witnesses:
Q. V. Groupe.
Murray C. Boyer.

Inventor:
Smith E. Hughes
by his Attorneys
Howson & Howson

UNITED STATES PATENT OFFICE.

SMITH E. HUGHES, OF PHILADELPHIA, PENNSYLVANIA.

WATER-CLOSET.

SPECIFICATION forming part of Letters Patent No. 481,761, dated August 30, 1892.

Application filed June 18, 1890. Serial No. 355,830. (No model.)

*To all whom it may concern:*

Be it known that I, SMITH E. HUGHES, a citizen of the United States, and a resident of Philadelphia, Pennsylvania, have invented certain Improvements in Water-Closets, of which the following is a specification.

My invention relates to that class of water-closets in which a double trap for the bowl is employed and in which the discharge is caused by exhausting the air from the space between the two traps, one object of my invention being to provide simple and efficient means for effecting this exhaust of the air, and a further object being to dispense with the use of any devices for retarding the closing of the discharge-valve, as in other siphon-closets. These objects I attain in the manner hereinafter set forth, reference being had to the accompanying drawings, in which—

Figure 2:
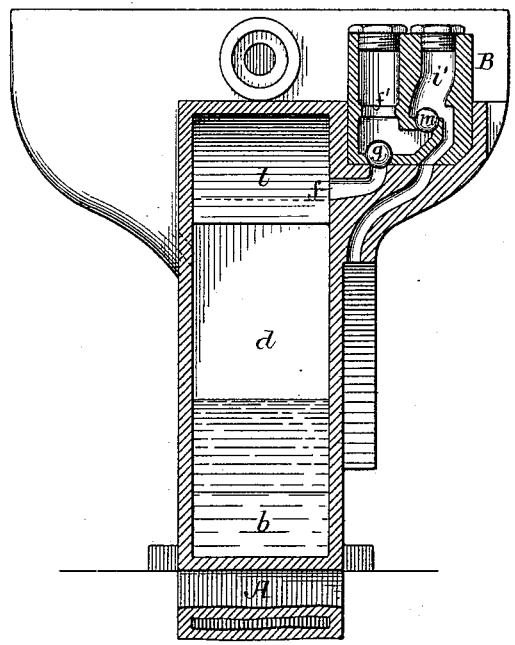
Figure 2:
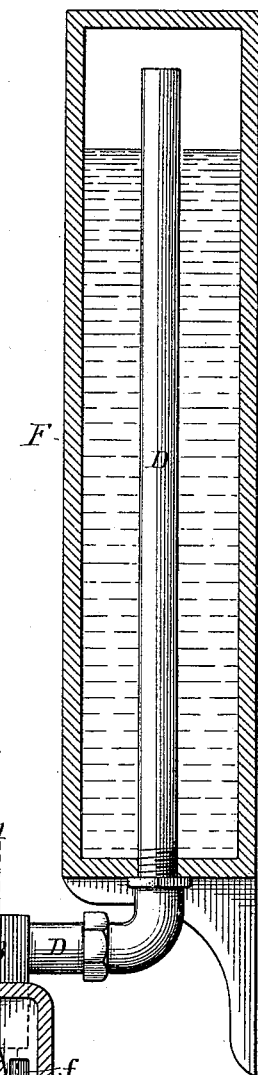
Figure 1:
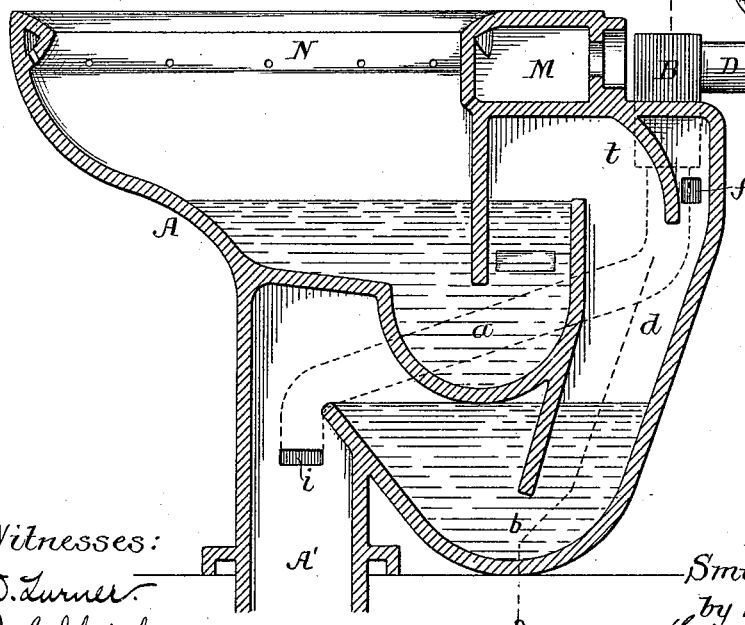
Figure 3:
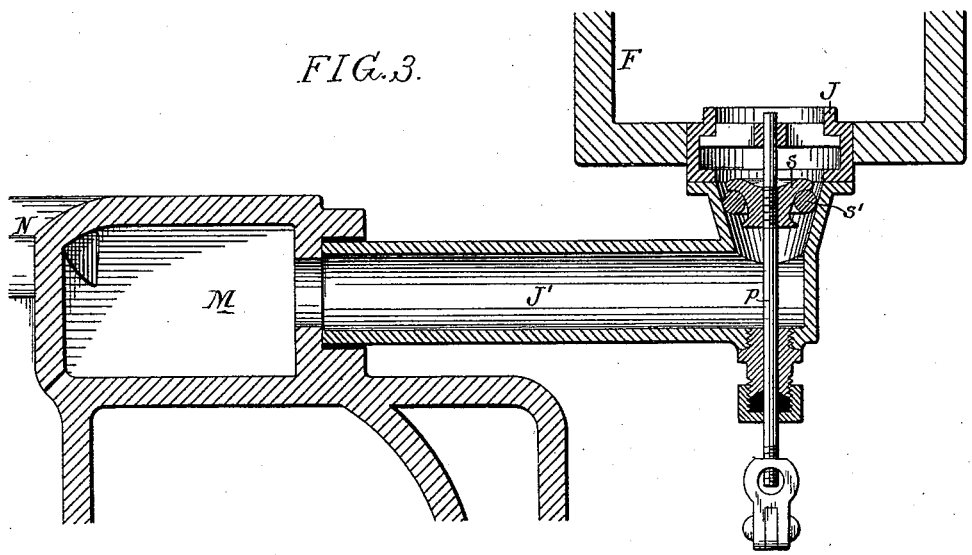
Figure 4:
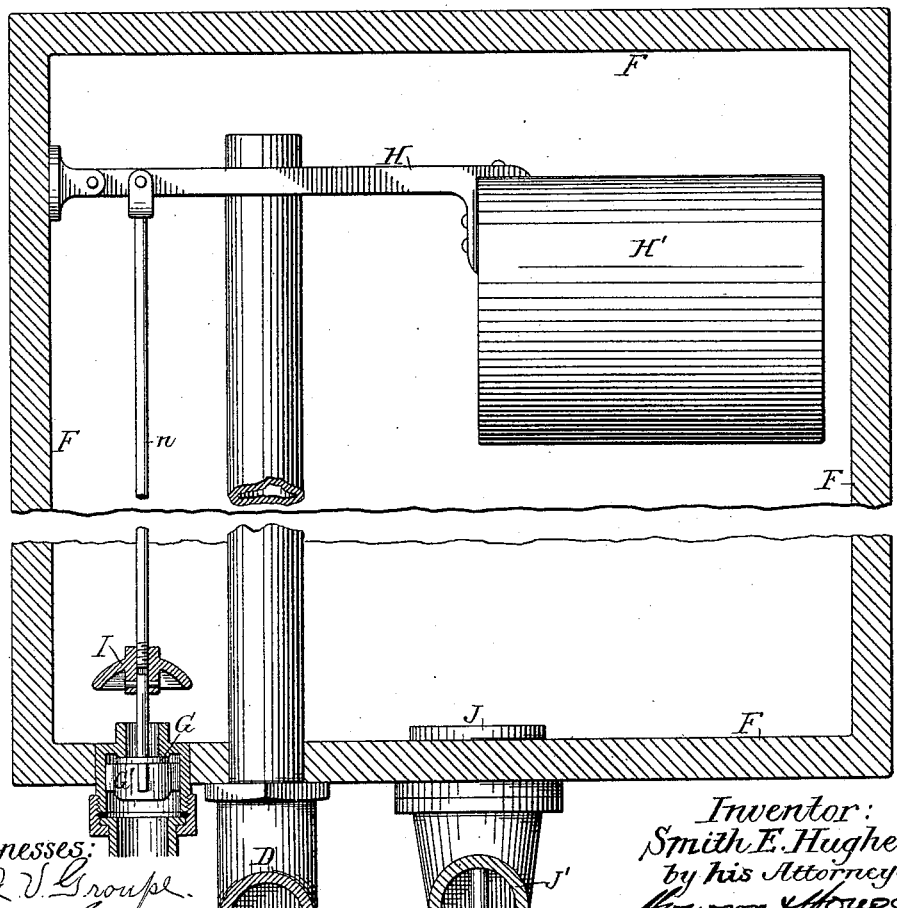

Figure 1 is a longitudinal section of a water-closet bowl and supply tank or reservoir therefor constructed in accordance with my invention, the supply-pipe leading from the tank to the bowl being omitted. Fig. 2 is a transverse section on the line 1 2, Fig. 1. Fig. 3 is a transverse section, on an enlarged scale, through part of the bowl and tank and through the valve which controls the communication between the tank and the bowl; and Fig. 4 is a longitudinal section of the tank, showing the inlet-valve therefor.

A is the bowl of the closet, having upper and lower traps $a$ and $b$ and between the said traps a closed chamber $d$, which communicates through a passage $f$ and through the chamber $f'$ of a valve-box B at the back of the bowl with a pipe D, which extends up in the tank E almost to the top of the same, as shown in Fig. 1, a valve $g$ closing the chamber $f'$ against any downward flow of air or liquid to the space between the traps, but opening to permit the free upward flow of air into and through said chamber. The valve-box B has another chamber $i'$, which communicates with a passage $i$, formed in the bowl and leading to the discharge-pipe A' of the same, as shown in Fig. 2, this chamber $i'$ of the valve-box having a valve $m$, which opens to permit a flow of air or water into the chamber $i'$ and passage $i$, but closes to prevent a flow in the opposite direction. When, therefore, water is permitted to flow from the reservoir into the bowl of the closet, the lowering of the level of water in said reservoir creates a partial vacuum in the upper portion of the same, it being understood that the reservoir is closed at the top. Owing to the partial vacuum thus created, the air is withdrawn from the space $d$ between the upper and lower traps of the bowl, and water and *excreta* are consequently sucked from the upper trap and bowl, so as to fill this space $d$, and thus, in connection with the lower trap, constitute a siphon, the action of which causes the continual withdrawal of the contents of the bowl and the discharge of the same through the lower trap and into the soil-pipe A'.

It will be observed that the volume of water in the discharge branch of the lower trap is much in excess of that in the receiving end, so that when a partial vacuum is formed in the space $d$ between the two traps the water will be withdrawn from the upper trap rather than from the lower one and that in any event the entire space between the two traps will be filled with water before there can be any inflow of air through the lower trap. As the water again rises in the tank or reservoir F the air is compressed in the upper portion of the same, and hence forced down through the pipe D, and if it had no means of escape other than into the space $d$ between the upper and lower traps it would displace the water in the upper trap, and thus escape into the bowl and into the room or apartment in which the closet was situated. In order, therefore, to provide a means of escape for the air discharged from the tank as the latter is refilled, I provide the valve-box B with its discharge-chamber $i'$ and valve $m$, so that as the air is forced into the chamber $f'$ of the valve-box it will lift the valve $m$ and pass through the chamber $i'$ and passage $i$ to the discharge-pipe A' of the bowl. It will be evident, therefore, that as all of the air for supplying the partial vacuum in the top of the tank is drawn from the space $d$ between the two traps and as air flows into this space from the bowl the latter will be thoroughly ventilated, while all discharge of air from the tank is directed to the soil-pipe A' without possibility of being forced through the upper trap and into the bowl. The pipe D also serves as an overflow-pipe for the tank, the water following the same course as that just described for the air. The supply of water enters the tank through a valve-box G, having a guided valve G', connected by a rod $n$ to a lever H, pivoted in the upper portion of the tank, and carrying a float H', as shown in Fig. 4. The rod $n$ is in two parts, the upper part being pivoted to the float-lever H and the lower part being pivoted to a disk I, the two pivots being at right angles to each other, so as to permit universal movement of the valve G' in adapting itself to its seat. The disk I also serves to prevent the dropping of foreign matter onto the valve, said disk being considerably greater in diameter than the opening of the valve-box G.

Water is delivered from the tank to the bowl through a valve-box J, which has a branch pipe J' and has a suitable stuffing-box and guide for the valve-rod $p$, the latter being operated by lever or handle mechanism of any appropriate character. The valve-box has a beveled portion K, and the valve consists of an inverted conical block $s$ and an elastic ring $s'$, surrounding said block and interposed between the same and the beveled portion K of the valve-box, so that on depressing the valve-block $s$ the valve-ring is caused to roll up on the cone until it is jammed between the same and the beveled seat and a tight joint is insured, the ring readily rolling down on the cone, and thus clearing itself on the rise of the block $s$, however, so that easy opening of the valve is insured. The branch pipe J' communicates with a supply tank or reservoir M, formed at the top of the bowl and extending across the back of the same and down on one side of the trap-casing, as shown in Fig. 2, this reservoir communicating with the flushing-rim N, which extends around the top of the bowl, as usual. The reservoir M on the bowl is of such capacity that after the valve in the chest J has been closed the reservoir will still contain a sufficient supply of water to fill the upper trap $a$ of the bowl, so that the usual means for causing an afterflow by a special construction of the valve are rendered unnecessary.

In order to prevent the drawing of water into the passage $f$ during the time that the air is being exhausted from the space $d$ between the two traps of the bowl, a shield or guard $t$ is formed, which effectually prevents the access of water or foreign matters to the said passage $f$.

The valve $g$ in the valve-box B may in some cases be dispensed with, as the valve $m$ would in all cases be raised before any displacement of water in the traps caused by pressure in the space $d$; but the use of said valve $g$ is preferred.

Having thus described my invention, I claim and desire to secure by Letters Patent—

1. The combination of the bowl having upper and lower traps, the tank, the exhaust-pipe leading therefrom, and a valve-box communicating with the exhaust-pipe and having two chambers, one communicating with the space between the two traps and the other with a discharge-passage leading to the discharge-pipe of the bowl, this latter chamber having a valve for preventing backflow through the discharge-passage, substantially as specified.

2. The combination of the bowl having upper and lower traps, the tank, the exhaust-pipe leading therefrom, and a valve-box communicating with the exhaust-pipe and having two chambers, one communicating with the space between the two traps and the other with a discharge-passage in the bowl, both of said chambers having valves, one for preventing backflow into the space between the traps and the other for preventing backflow through the discharge-passage, substantially as specified.

3. The combination of the tank, the inlet-valve chest and its valve, a float-lever, and a valve-rod having a disk covering the mouth of said inlet-chest, substantially as specified.

4. A siphon water-closet bowl having a flushing-rim of capacity equal to or in excess of that of the trap which seals the short leg of the siphon, substantially as specified.

5. A siphon water-closet bowl having a flushing-rim enlarged in area in that portion which extends across the rear of the bowl, whereby the capacity of the rim is caused to equal or exceed that of the trap which seals the short leg of the siphon, substantially as specified.

In testimony whereof I have signed my name to this specification in the presence of two subscribing witnesses.

SMITH E. HUGHES.

Witnesses:
EUGENE ELTERICH,
HARRY SMITH.